Aug. 23, 1960  R. E. DODDS ET AL  2,950,125
STAKE RELEASE AND RESETTER
Filed July 24, 1958  2 Sheets-Sheet 1
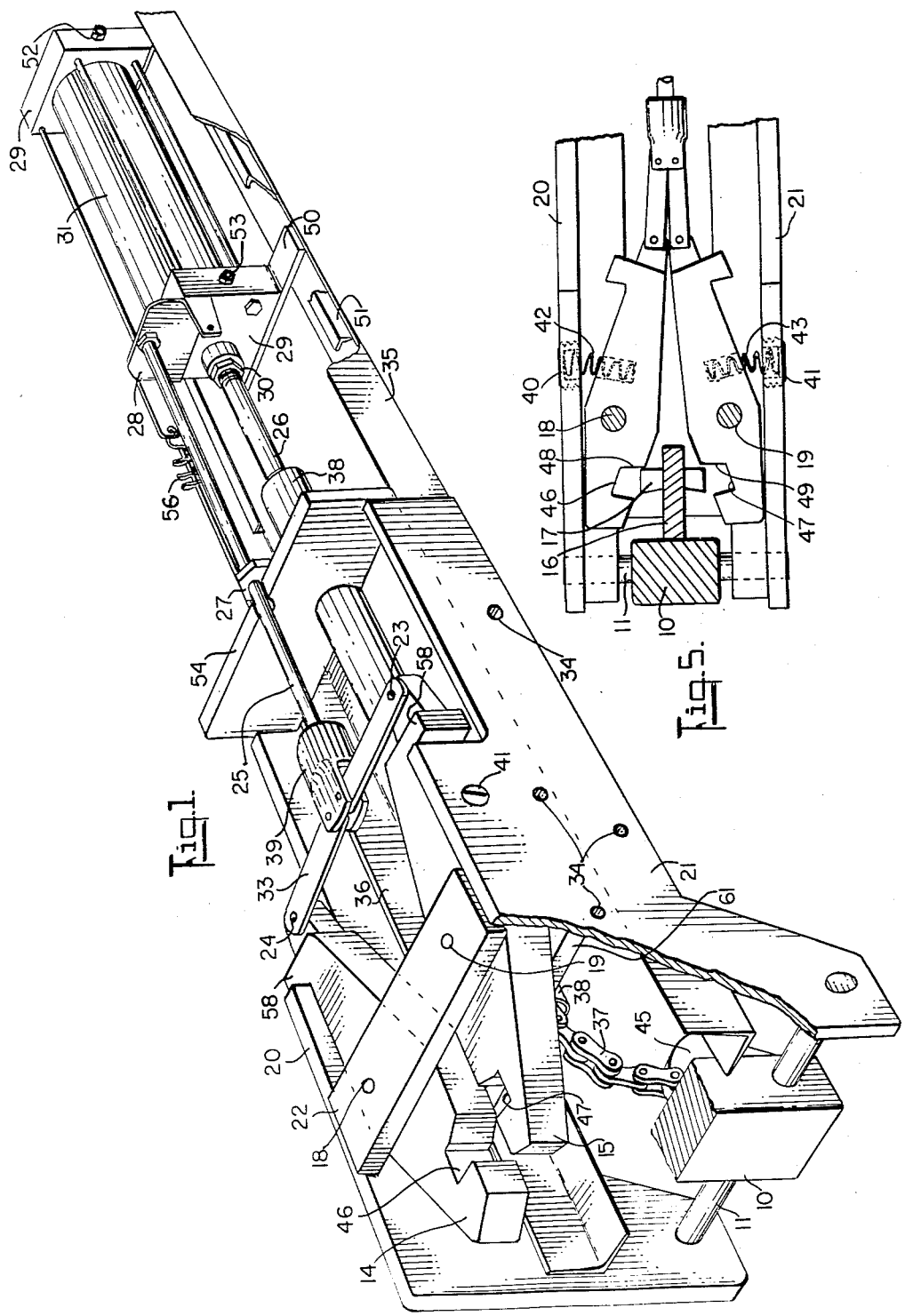

Aug. 23, 1960   R. E. DODDS ET AL   2,950,125
STAKE RELEASE AND RESETTER
Filed July 24, 1958   2 Sheets-Sheet 2
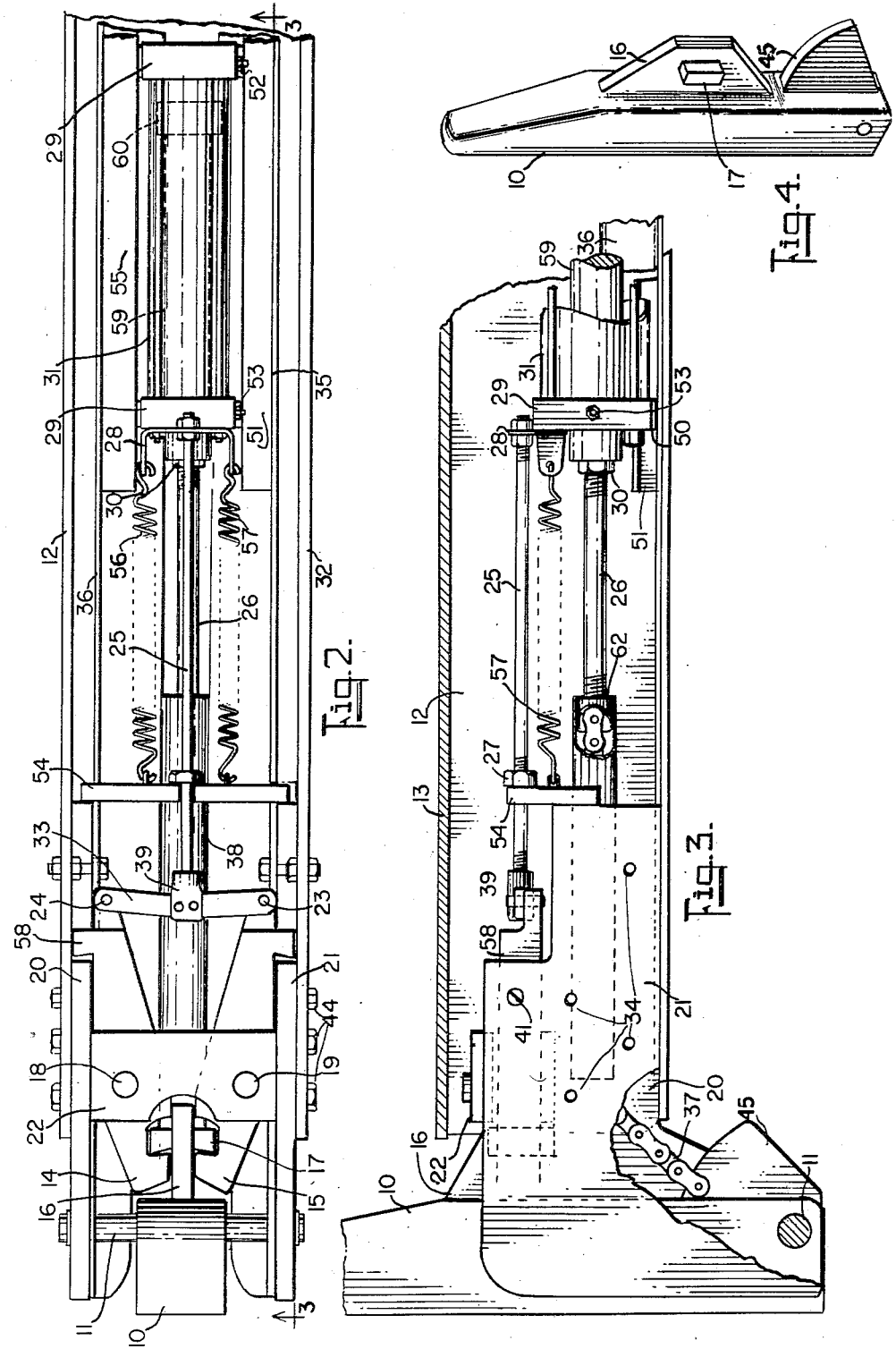

United States Patent Office 2,950,125
Patented Aug. 23, 1960

2,950,125

STAKE RELEASE AND RESETTER

Robert E. Dodds, Ganges, British Columbia, and Alexander S. Dodds, Victoria, British Columbia, Canada, assignors to Maxwell-Dodds Manufacturing Company Limited, Victoria, British Columbia, Canada Filed July 24, 1958, Ser. No. 750,714

3 Claims. (Cl. 280—145)

This invention relates to pivotable stakes for retaining elongate objects such as logs, poles, and pipe on a vehicle bed, and in particular concerns remotely controllable powered mechanism and improved latch construction employing motor means and linear coupling elements effective to rotate a stake into its erected latching position for one sense of applied drive, and for releasing the stake from such latched position for the reverse sense of applied drive.

The hauling of logs by freight vehicles of the multiple transverse bunk type is facilitated by the provision of a number of stakes pivotable about aligned horizontal axes beneath one side of the vehicle bed, the stakes being released from the erected position to rapidly unload logs carried on the bed. Powered stake release and raising devices have been proposed heretofore, but prior art systems employed for the release or raising of the stakes have often proved hazardous, through not being fully automatically controllable from a remote safe position by the operator, and through failing to provide adequate provisions for safety in the case of mechanical failures or accidental movement of controls.

Essentially the stake release and resetting mechanism according to the present invention consists in a framework adapted to be received and secured into a transverse bunk or other support structure of the bed of a vehicle, in which motor drive means is coupled by flexible inextensible linkage with a stake pivotable about a transverse axis in the framework; a latch mechanism comprising a pair of jaws each pivoting about a vertical axis between alternative limit positions in which the jaws are biassed, cooperatively engaging a lug intergal with the stake when the lug has been driven between the jaws; and a mechanical linkage interlocking the jaws and coupled with the housing of the motor drive means for holding the jaws closed unless the motor drive is operated in the sense opposite to the sense for which the stake is raised, the direction of displacement of the housing being opposite to the displacement of the motor drive, and the housing being biassed toward one position but freely moveable in the framework.

In a preferred organization the stake raising mechanism is powered by a linear acting fluid pressure driven piston reciprocable in a cylinder housing, and the stake latch mechanism is mechanically linked with the cylinder housing of the piston-and-cylinder combination, so that as the piston is displaced relatively to the cylinder to effect raising of the stake, latch jaws remain in their biassed-open state until driven into their biassed-shut position, while in the reverse sense of drive of the piston the linkage connecting the stake and piston is ineffective to move the stake while the latch jaws are forcibly opened and driven into their alternative stable biassed position.

In carrying the invention into effect by a preferred embodiment, a unitary stake supporting and operating mechanism is enclosed in an elongate frame adapted to be detachably removed from a bunk or equivalent framework in the bed of a vehicle, the stake being pivotable about a horizontal axle disposed below the frame adjacent one end thereof, and a linear-acting fluid motor such as an air motor comprising a cylinder and piston is guidedly moveable along the length of the frame and has its piston linked as by a chain with the stake so that application of fluid under pressure to one end of the motor is effective to erect the stake from a previously lowered position; a pair of horizontally spaced apart opposed latching jaws are driveable about vertical axes in each latch from their opened position by the impact of a lug which is integral with the stake when the latter is rotated into the fully erected position, whereupon biassing springs retain the jaws engaged with and locked together upon the lug; a rigid linkage is coupled between the motor cylinder and the pair of latch members, whereby movement of the cylinder away from the jaws rotates the latches into the opened position and movement of the cylinder in the reverse direction by application of fluid pressure in a predetermined sense within the cylinder locks the jaws.

The invention may be the better understood by reference to the accompanying drawing, wherein:

Fig. 1 is a perspective view of a frame showing the latch mechanism and fluid pressure operating motor having its cylinder coupled therewith and its piston rod linked by chain means to the stake, part of the latter having been removed for clarity;

Fig. 2 is a plan view of mechanism as in Fig. 1 located in a vehicle bunk, the latter having its cover plate removed;

Fig. 3 is an elevation view partly in section of the assembly shown in Fig. 2, the section being taken along line 3—3 of Fig. 2;

Fig. 4 is a perspective view of one form of stake; and

Fig. 5 is a plan view of the latch mechanism of Fig. 3 as operated to the point of release of the stake member.

Referring to the drawing, the stake operating mechanism according to the invention is carried by a supporting framework formed in part by a pair of parallel spaced-apart side members shown as plates 20 and 21, between which a stake 10 is pivotable about a horizontal axle 11 journalling in bearings held in the lower ends of extensions depending from adjacent ends of the side members. The framework further comprises a pair of longitudinally aligned members in the form of angles 35 and 36 which are integrally secured with the respective side plates and which extend horizontally away from the stake. Slidably supported upon and between the angle members is a motor mechanism which may take the form of a conventional type of fluid pressure operated piston and cylinder combination comprising the cylinder housing 31 retained between the pair of end blocks 29, enclosing a piston 60, shown in phantom outline, having a rod 59 extending from an aperture in one block. A pair of retaining angles 51 and 55 are affixed as by welding or by other suitable attaching means to the inside face of each of the elongate frame members to retain the slider feet 50 secured to the base of each of the blocks 29.

The framework is cross braced by a transverse vertical member 54 joined at its ends to each of the side plates 20 and 21 at their adjacent ends remote from the stake, and is further secured together by a pair of parallel vertically spaced apart transverse horizontal bars 22 and 61 adjacent to the stake, between which bars the latching members identified by their jaws 14 and 15 are pivotably supported. Each of the jaws is rotatable through a limited angular displacement about its own vertical pivot axis in respective pins 18 and 19 whose ends are secured in holes in the bars 22 and 61.

In the erected and latched position of the stake illustrated in Figs. 1, 2 and 3, the stake is retained by seating its integral lug 17 which is carried by and fixed to web 16 extending to one side of the stake, within a pair of notches 46 and 47 recessed into the opposed vertical faces of jaws 14 and 15. In the erected position it may be observed that the hook ends 58 of the latching members remote from the stake are spread apart and the hooks extend outwards past the inner faces of side plates 20 and 21. Secured upon the ends 58 are respective links of the link pair 33 pivoting about respective vertical axes in pins 23, 24. The inner ends of the links are likewise rotatably supported as for example on pins in the fitting 39 which is coupled to one end of a rod 25. The latter is longitudinally aligned with the frame and has its other end joined to a fitting 28 secured on the near end block 29 of the fluid motor cylinder. In the closed jaw position of the latch mechanism, the links 33 are substantially aligned end to end or may even have the pivot axes of their inner ends somewhat closer to the stake than those of their outer ends. In this position the cylinder 31 lies its nearest to the end frame 54, as determined by the setting of a stop nut 27 adjustably fixed on rod 25. A pair of retaining springs 56, 57 secured between fitting 28 and frame 54 under tension, as may be most clearly observed in Figures 2 and 3, hold the cylinder in the position described, as a first limit position. In order that cylinder 31 should remain at rest in this limit position the fluid pressure acting to displace piston 60 to the left should be less than that which will overcome the spring bias force, as will be more fully described hereafter.

The connecting chain 37 by which the stake is coupled to the piston is pinned rotatably at one end to a cam-shaped web 45 adjacent the stake axle 11 and is connected at its other end with the end of the piston rod extension 26. It will be seen on referring particularly also to Fig. 3, in which is illustrated the relationship of the parts at the conclusion of the erecting movement of the stake that when the piston rod extension lies in its alternative limit position furthest away from the stake, the end fitting 62 carried by the extension is adjacent the end of a tubular housing 38 in which the chain is freely guided. Movement of the piston rod 59 to the left in Fig. 3, i.e. toward the stake, is ineffective to release the latch, so that chain 37 is pushed out of the stake end of pipe 38 to hang as a loop. Adjustment of the stroke length is provided by setting the locking nut 30 on the end of the piston rod, with the back face of the nut bearing against the end of tube 38.

Latch release operation

The operation of the mechanism for the release of the stake from its erected, latched position as shown in Fig. 2 is effected by admitting air or other fluid under pressure by way of port 52 and simultaneously opening port 53 to bleed air. Any of several suitable known control devices may be employed for this purpose, such as turn valves, and it is to be understood that suitable pressure-retaining hose or lines (not shown) would be connected between a source of fluid under pressure and the ports 52, 53, by way of such control devices. Assuming that fluid is effectively applied within the cylinder at a sufficient pressure, the effect will be to urge the piston 60 relatively toward the stake and the cylinder 31 away from the stake. Since the cylinder is opposed from moving to the right by reason of the tension forces exerted by springs 56, 57 urging it to the left, the admission of fluid causes the piston rod extension 26 to move toward the stake and to push chain 37 through guiding pipe 38. The movement of fitting 62 and of the attached length of chain represents a very small load included with the inertial load of the rod upon the piston so that no movement of the cylinder occurs until the stop nut 30 meets the end of tube 38.

It is to be noted that if the stake 10 is subjected meanwhile to a large force directed in such sense as to produce counter-clockwise rotation in the Fig. 3 view, the lug 17 held by jaws 14 and 15 exerts an outwardly directed pull on the latch mechanism tending to bring the hook ends 58 towards each other; however, since links 33 are substantially aligned or may even have their inner pivots over center so that the latter are closer to the stake than their pivots 23 and 24, the torque produced by the load serves to urge fitting 39 toward the stake. Consequently the load on the stake assists in opposing any movement of the cylinder that otherwise might tend to release the stake.

When the further motion of the rod 26 is stopped, the build up of fluid pressure between the piston and that end wall of the cylinder lying remote from the stake causes the cylinder to be urged to the right, overcoming the force of springs 56, 57 as well as inertial load forces and any opposing force developed by reason of the weight of logs retained on the vehicle by the stake. The air cylinder 31 accordingly moves to the right, pulling rod 25 and fitting 39 to the second limit position illustrated by Fig. 5, wherein the hook ends 58 of the jaws are brought together and the links 33 are adjacently disposed in parallel. The stake is free to fall and in rotating outwards and downward about its axle bearings it winds up the free length of chain 37 upon the arcuate edge of cam 45. The total length of chain is preferably so proportioned that when the stake has fallen to its lower limit position there is no excessive slack in the chain.

In the released position, the pressure of fluid within the cylinder may be reduced to equilibrium on both sides of the piston, as by exhausting air to atmosphere out of port 52, whereupon the jaws 14 and 15 remain in their opened condition by virtue of the biassing action of springs 56 and 57. The latch members are stable in this position since the outer ends of links 33 have their pivots 23, 24 lying inside of the respective lines joining the axes of pivots 18 or 19 with the inner pivot axes of the links. Consequently the biassing force exerted upon rod 25 serves to retain the ends 58 of the jaw members pressed together. The positive locking of the jaws in their open position is assured by the action of the pair of compression springs 42, 43 seated in cup bodies 40 and 41 respectively in the side plates 20 and 21. The inner end of each spring is guided in a recess in each latch member and the force exerted upon each latch member positively drives the jaws 14 and 15 open and the near edges of the hook portions 58 together.

Stake resetting operation

Automatic resetting of a stake is accomplished by the admission of fluid under pressure, such as air, by suitable control means as described hereinbefore, which as stated may be a manually controlled valve located remotely in hose or fluid lines connected between a source and the fittings 52 and 53. The latter fitting communicates with the cylinder space adjoining the reverse side of the piston 60, i.e. the side which is nearer the stake. The admission of air thus serves to relatively displace the piston with its rod 59 and rod extension 26 toward the right, viz., in a direction away from the stake, which motion is relatively unopposed, and simultaneously to urge the cylinder body 31 toward the left. Motion of body 31 toward the stake is blocked due to the over-center setting of the latch members and links 33 for the open jaw state. The piston therefore raises the stake into the substantially vertical position. Near the end of its rotation, lug 17 has entered between the opened jaws 14 and 15 and ultimately strikes the faces 48 and 49 presented to it by the notches formed in the jaw faces. Whether driven by the piston or by its own momentum the stake serves to drive each latch member about its pivot axis toward web 16 to enclose lug 17 within the notches. After a limited rotation has been imparted to the latch members the hook ends 58 thereof are sufficiently moved apart to trip the toggle. The links 33 rotate apart as the pressure of air in the stake end of the cylinder housing urges rod 25 to its near limit position. The motion is assisted by springs 56, 57 which are under tension. At the conclusion of the movement the hook ends 58 of the latch members are seated in the openings in the side plate. Further application of fluid pressure at port 53 now serves only to maintain chain 37 taut without effecting rotation, so that pressure may be entirely removed. In the closed latch position springs 42 and 43 are compressed and seated within their recesses, but since the links 33 are now aligned end-to-end in the alternative toggle position of the latch, the jaws cannot open.

In the event that springs 56 and 57 should both fail while the latch members are closed upon the stake, the latch remains closed, since springs 42 and 43 would have to be further compressed before the links 33 pass over center toward the cylinder.

In the event that either or both of the pins 18, 19 should fail by shear, the hook ends 58 provide a safeguard against release, by engaging the edges of the vertical riser of the stepped upper edges of plates 20, 21.

The exact form of lug 17 may be varied considerably, and may conveniently take the form of a short thick cylinder set transversely of the web 16 and secured as by welding. A preferred shape is that of a rectangular block having its narrowest dimension aligned with the web, and its face nearest the stake concavely shaped. Such form provides for applying load to the latch jaw at a point well inside notches 46 and 47, thereby reducing the torque exerted on the latch member due to load on the stake.

Numerous design variations will readily suggest themselves to those skilled in the art, in embodying the teachings hereinbefore presented; applicants accordingly regard their invention as not limited specifically to the forms herein described, but rather as may be fairly construed from the appended claims.

We claim:

1. In combination with a latchable element, powered latch mechanism comprising a frame, a pair of latches spaced apart and pivotable in the frame about first respective parallel axes intermediate the ends of said latches, like jaws formed in said latches at their one ends, a pair of links each having its outer end pivotally connected with the other end of a latch and its inner end pivotally connected with a fitting for relative rotations of said links about axes parallel with said first axes and having a combined length such that when the jaws are closed the links are substantially aligned, first resilient means in the frame biassing the said other ends of said latches together, a motor including a housing and a drive member relatively moveable therewith, means coupling said drive member with the latchable element effective to impart driven movement of the element into the latches for one sense of motor drive, means coupling said housing with said fitting support means adapted to guide movement of said housing in the frame in opposite sense to said driven movement between a first stop means in the frame defining a first limit position in which said links are substantially in line and a second limit position in which said links are rotated into substantial parallelism, and second resilient means biassing said housing tending to rotate the said links into substantially aligned relation, said first and second biassing means cooperating with said latches to establish a pair of stable rest positions in which the latch jaws are respectively open and respectively closed.

2. The combination of claim 1 wherein said latches have jaw faces adapted to be struck in their opened position by the latchable element intermediate the jaw end and the pivot to apply a component of force directed between the latch pivot axes effective to initiate rotation of the latch toward the closed position and said second biassing means establishes the closed jaw equilibrium position.

3. The combination of claim 1 wherein said motor comprises a linear acting fluid pressure piston reciprocable in a cylinder housing in directions normal to a line which joins the latch pivot axes and normal to said axes, and said piston extends toward and is joined by flexible inextensible coupling means with said latchable element.

References Cited in the file of this patent

UNITED STATES PATENTS

| | | |
|---|---|---|
| 786,961 | Drakes | Apr. 11, 1905 |
| 857,026 | Brown et al. | June 18, 1907 |
| 2,546,511 | Jorgenson et al. | Mar. 27, 1951 |
| 2,677,552 | Dodds et al. | May 4, 1954 |